United States Patent [19]

Vincent

[11] 4,163,523

[45] Aug. 7, 1979

[54] MULTICOLOR PAINT DISPENSING SYSTEM HAVING A PRESSURE RESPONSIVE COLOR CHANGE VALVE

[76] Inventor: Raymond A. Vincent, 9307 Marion Crescent, Detroit, Mich. 48239

[21] Appl. No.: 750,836

[22] Filed: Dec. 15, 1976

[51] Int. Cl.² .............................................. B67D 5/60
[52] U.S. Cl. .................................. 239/305; 222/135; 222/144.5; 222/318; 239/112
[58] Field of Search ............ 222/132, 135, 136, 144.5, 222/318, 129, 145; 137/860, 606, 512; 239/112, 305, 127

[56] References Cited

U.S. PATENT DOCUMENTS

| | | | |
|---|---|---|---|
| 2,244,686 | 6/1941 | Garrison et al. | 222/318 X |
| 3,348,774 | 10/1967 | Wiggins | 239/112 X |
| 3,443,578 | 5/1969 | Hedin | 137/606 X |
| 3,451,422 | 6/1969 | Chorkey | 137/512 X |
| 3,572,366 | 3/1971 | Wiggins | 137/606 X |
| 3,674,205 | 7/1972 | Kock | 239/112 X |
| 3,857,405 | 12/1974 | Heideman | 137/860 X |

*Primary Examiner*—David A. Scherbel
*Assistant Examiner*—Fred A. Silverberg
*Attorney, Agent, or Firm*—Krass & Young

[57] ABSTRACT

A multi-color paint dispensing system for one or more paint guns wherein a small, simple, color changing valve mechanism is disposed proximate the dispensing gun. The color changing valve mechanism comprises a body carrying a plurality of pressure responsive check valves which are connected to individual paint supply lines. A remote valve bank responds to selection signals to individually pressurize the paint supply lines, the line selected for pressurization being operative to unseat the check valve in the color changing valve mechanism and permit paint to flow to the dispensing gun or guns. The illustrated check valves employ annular seats having radially expansible O-rings disposed thereon, the O-rings normally closing the radial paint passage but being responsive to paint pressure to expand outwardly to permit fluid flow.

7 Claims, 7 Drawing Figures

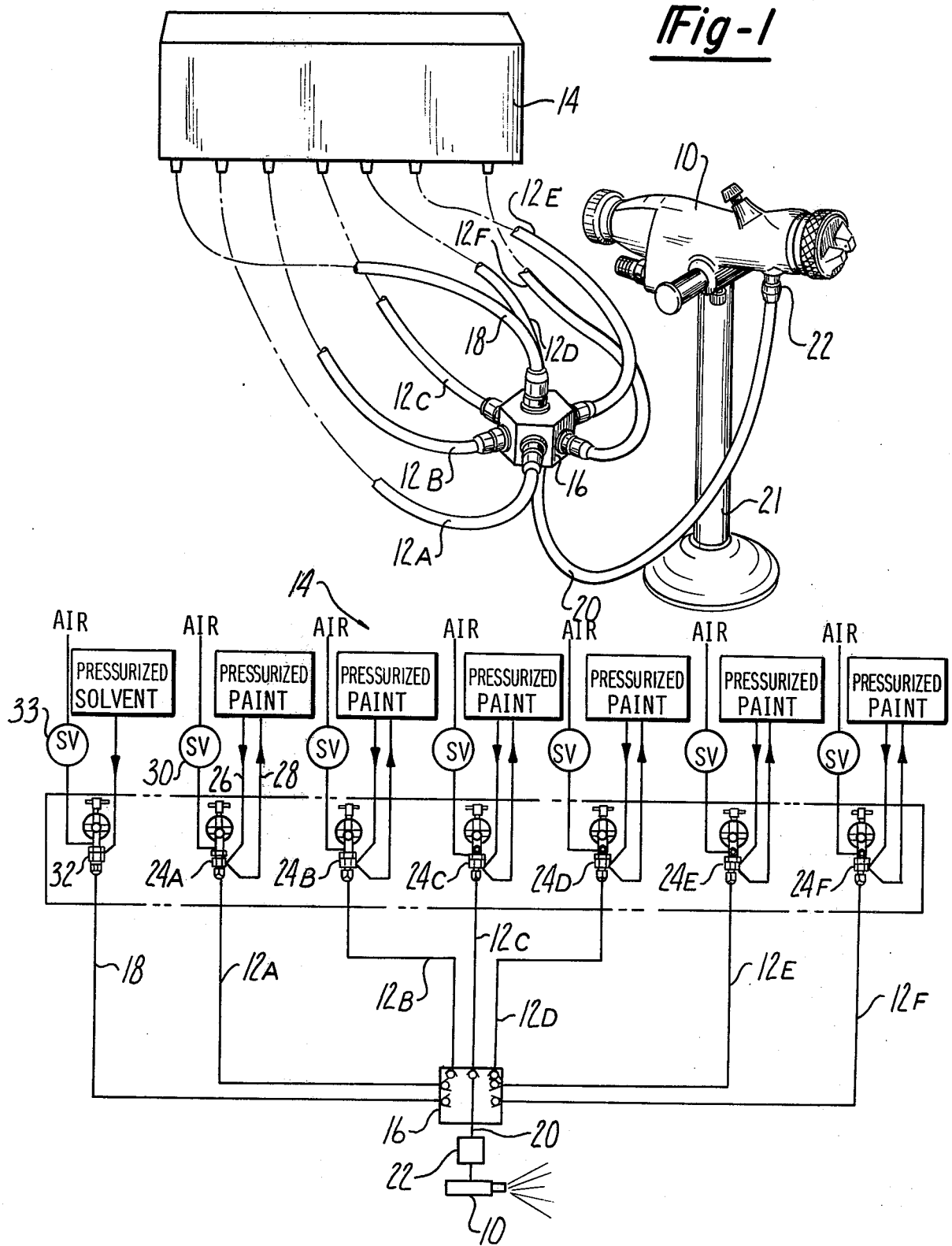

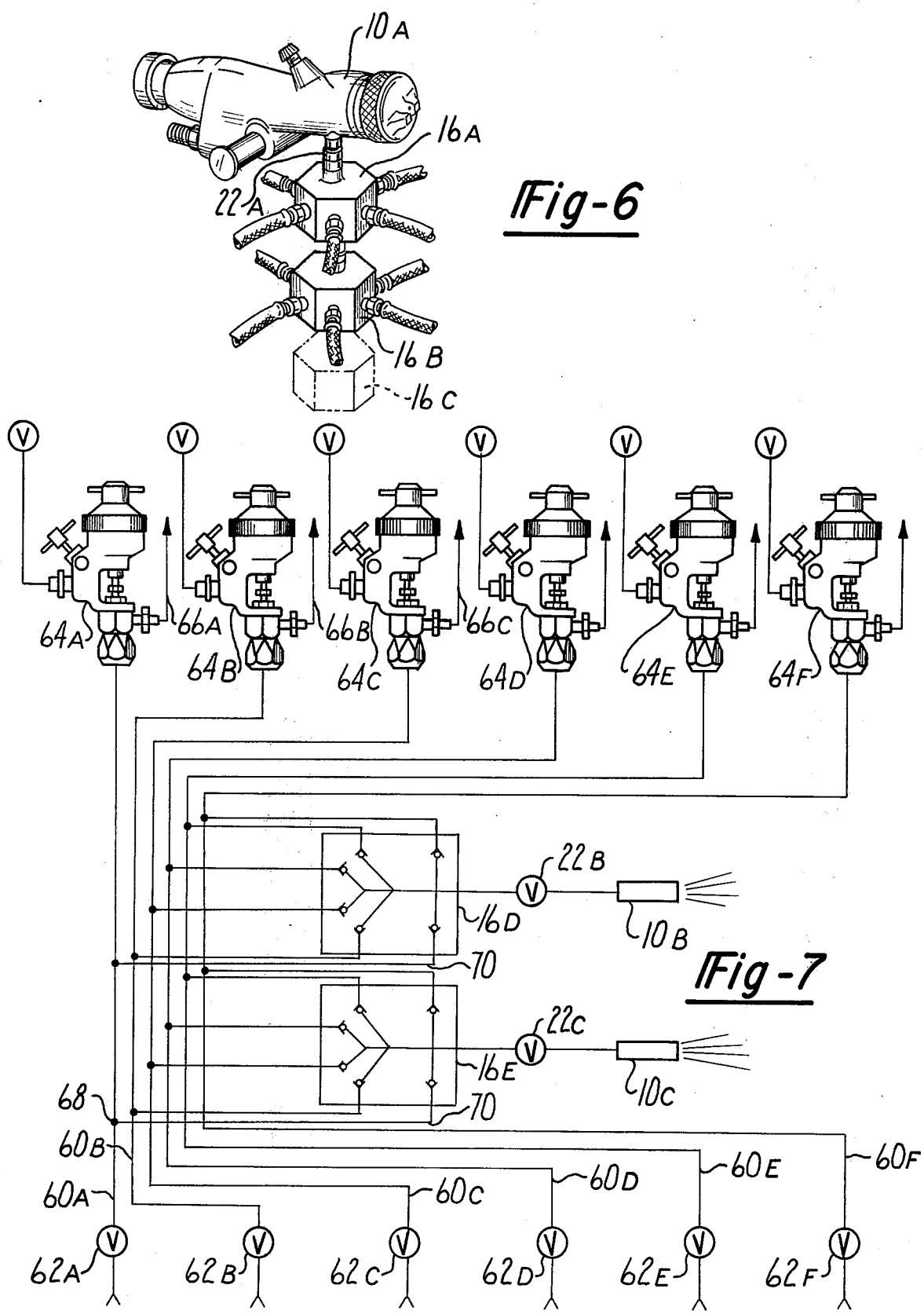

MULTICOLOR PAINT DISPENSING SYSTEM HAVING A PRESSURE RESPONSIVE COLOR CHANGE VALVE

INTRODUCTION

This invention relates to paint dispensing systems and particularly to a multi-color system wherein a color changing valve mechanism is disposed proximate the dispensing point.

BACKGROUND OF THE INVENTION

Multi-color paint dispensing systems are commonly used to paint production articles such as automobiles. Such systems typically comprise a color changer connected to the paint supplies and to the dispensing gun, the latter connection being made through a relatively long line moved around without the need to move the color changer with it.

Changing colors usually requires dumping the paint in the line between the color changer and the gun to avoid a color mix. A solvent purge between colors may also be required. Frequent color changes result in the non-productive disposition of surprisingly large quantities of paint representing a great deal of expense.

Accordingly, there exists a need for a small, light and relatively simple color change mechanism which may be located proximate or on the paint dispenser gun thereby minimizing the line length between the color changer mechanism and the gun and reducing the paint loss associated with frequent color change.

BRIEF SUMMARY OF THE INVENTION

This invention provides for the reduction of paint loss resulting from a color change operation. In general, this is accomplished by providing a pressure-responsive valve mechanism of such simplicity and size as to be mountable proximate or on the paint dispensing gun.

More specifically, a system embodying the invention comprises a paint dispenser such as an air-operated atomizing gun, a plurality of paint supply lines, typically representing different colors, means such as a remotely located valve bank for selectively pressurizing the paint supply lines to promote the flow of paint therein, and a color changing valve mechanism mounted proximate or on the paint dispenser and having plural inlets connected to the supply line and a single outlet connected to the dispenser, the color changing valve mechanism comprising a plurality of paint pressure responsive check valves individually connecting the inlets to the outlet whereby pressurization of an individual line causes paint to be dispensed from that line only, the unpressurized lines holding non-flowing or static paint ready for later selection. The result is rapid color change with minimized paint loss since the distance from outlet to gun is minimal.

According to the preferred embodiment, hereinafter described in greater detail, the color changing valve mechanism comprises a small, metal valve housing having a plurality of threaded apertures formed therein and in fluid communication with an interior chamber having an outlet passage and a plurality of check valve bodies threaded into the apertures for connection to the paint supply lines. The check valves are of the normally closed, pressure responsive type such that pressurization of paint in a supply line connected thereto causes the valve to open to permit paint to flow from the supply line to the outlet passage. The absence of pressurization in any supply line results in valve closure and the termination of paint flow.

In a specific form the check valves may be implemented using radially expansible O-rings resiliently disposed on an annular seat to act as the pressure responsive stop means.

The invention as well as the use and implementation thereof will be best understood from a reading of the following specification which is to be taken with the accompanying drawings.

BRIEF DESCRIPTION OF THE DRAWINGS

FIG. 1 is a perspective view of a single gun multi-color paint dispensing system constructed in accordance with the invention;

FIG. 2 is a detailed diagram of the paint dispensing system of FIG. 1 showing the pressure selection valve system in greater detail;

FIG. 6 is an illustration of a paint gun with several color changing valve mechanisms mounted thereon in series; and FIG. 7 is a schematic circuit diagram of a paint spray system with circulating paint supply lines running to the paint gun.

DETAILED DESCRIPTION OF THE SPECIFIC EMBODIMENT

Figure 3:
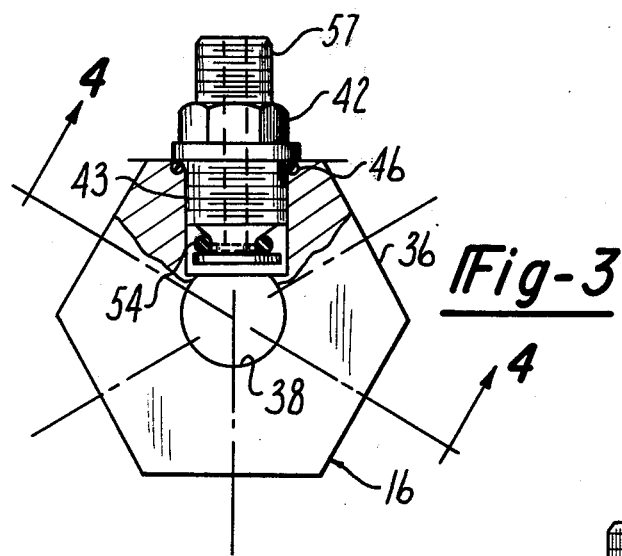
FIG. 3 is a detailed drawing, partly in section, of a color changer valve mechanism constructed in accordance with the invention.

FIG. 1 shows a single gun, multi-color paint dispenser system for spraying automobiles and other production articles according to a desired paint program. The system comprises a standard air operated atomizing gun 10 which may be pedestal-mounted as shown, or hand-held to dispense air atomized paint toward and onto the articles to be painted. Gun 10 may also be mounted on an automated carriage if desired. The paint spray system further comprises a plurality of paint supply lines 12a, 12b, 12c, 12d, 12e and 12f connected between a remote valve bank 14 and a color changing valve mechanism 16 which is disposed proximate the gun 10. Color changing valve mechanism 16 comprises a plurality of inputs connected to receive the paint supply lines 12, and a single output connected to a paint line 20 which extends through a restrictor valve 22 to the gun 10 as shown. In addition, a solvent line 18 extends between the remote valve bank 14 and the color changer mechanism 16 to permit line 20 to be purged between color selections. Mechanism 16 may be secured to the paint gun 10. Alternatively, the mechanism 16 is small and light enough to be left supported by the outlet line 20 and the paint supply lines 12. It is to be understood that line 20 is exagerrated in length in FIG. 1, the object being to minimize this length to reduce the paint loss resulting from color changes.

Looking now to FIG. 2, the details of the remote valve bank 14 are shown in greater detail. Bank 14 comprises a plurality of air signal responsive valves 24a, 24b, 24c, 24d, 24e and 24f connected to single color paint circulation lines such as lines 26 and 28 associated with valve 24a. In addition, each valve 24 is connected to an individual paint supply line 12, such lines extending from the valves 24 to the color changer mechanism 16 as previously described. Finally, each valve is connected to receive an air trigger signal through a solenoid valve; for example, valve 30 associated with valve 24a is representative.

In normal operation, solenoid valve 30 is closed thus preventing an air trigger signal from being applied to valve 24a. Under these conditions paint flowing through line 26 merely circulates back to the paint supply by way of line 28 to maintain the paint in a fresh and uncongealed condition. Assuming line 12a has been operated previously, paint exists in a static condition between valve 24a and mechanism 16, a check valve in mechanism 16 being effective to prevent the unpressurized static paint from flowing through outlet line 20 to the gun 10.

Upon application of an electric trigger signal to solenoid valve 30, the valve opens and permits air to be applied to the main valve 24a, lifting a valve plunger from its seat and permitting the pressurized paint in line 26 to flow into supply line 12a. The application of pressure to line 12a unseats the check valve in mechanism 16 and permits the paint from valve 24a to flow through color changer mechanism 16, line 20, and pressure-regulating restrictor valve 22 to the dispenser gun 10. Removing trigger signal from solenoid valve 30 cuts off the air trigger signal to valve 24a and immediately reduces pressure in supply line 12a. The check valve mechanism 16 responds by closing off the flow of paint from supply line 12a to outlet line 20 and terminating the paint spray process.

Before selecting a new color, it may be desirable to purge the mechanism 16 and line 20 by causing a short burst of solvent to flow through the line 20 and gun 10. This may be accomplished by means of a solvent control valve 32 having a solenoid valve controlled air trigger passage 33. Solvent flows into the valve 32 on line 34, no circulation being necessary to maintain the useability of the typical solvent.

Valves 24 are commercially available devices and preferably take the form of the Graco Model No. 205-435 needle-type paint dispensing valves. The valves 24 are also preferably mounted in a cabinet of the type shown in FIG. 1 which may be disposed in or near the paint room but remote from the color changer mechanism 16 for ease of servicing.

Figure 4:
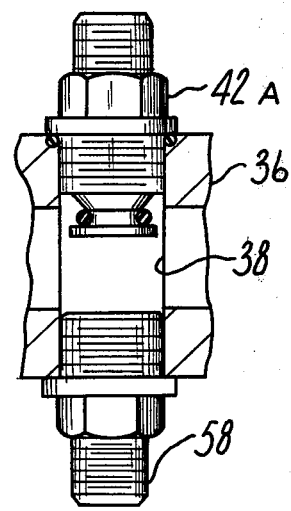
FIG. 4 is a detail of the color changer valve mechanism of FIG. 3 taken along a section line 4-4.
Figure 5:
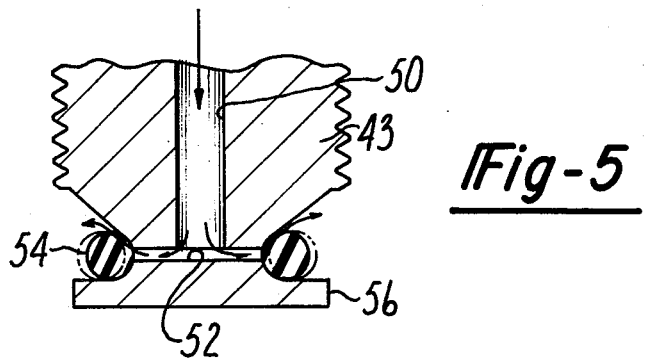
FIG. 5 is an enlarged detail of the color changer mechanism of FIG. 3 illustrating the pressure responsive valve stop and seat therefor.

Looking now to FIGS. 3 through 5, the details of an illustrative form of the color change mechanism are shown. As previously described, the color change mechanism 16 comprises a plurality of pressure responsive check valves in fluid communication with the supply lines 12 and responsive to pressurization of the static paint quantity in the supply line between valve bank 14 and the outlet line 20 to select paint for dispensing purposes.

To accomplish this, mechanism 16 comprises a polygonal valve body of aluminum, stainless steel, or other suitable high quality metal having a bore 38 formed therethrough and between the major plane faces thereof as best shown in FIG. 4. In addition, apertures are bored through the peripheral flat faces of the polygonal body 36 to define an interior chamber which is in common fluid communication with each and every one of the apertures formed in the body. All of the apertures formed in the body are threaded. Thereafter, seven of the eight apertures are equipped with short cylindrical check valve bodies 42 which are configured so as to provide a stem 43 which may be threaded into the aperture until an enlarged shoulder 44 abuts the exterior face of surface of the color changer mechanism body 36. An O-ring 46 carried on the shank 43 just under the shoulder 44 seals the check valve body relative to the color changer mechanism body 36. Each of the check valve bodies 42 is bored through from the outside end to a point near the opposite end as indicated by reference numeral 50. The bore 50 terminates at a lateral bore 52 to provide at least one and preferably two or four radial passages terminating in a seat of annular configuration formed by reducing the diameter of stem 43 as indicated at taper 48. Taper 48 ends abruptly at end flange 56 to receive and secure in place a radially expansible O-ring 54 which acts as a resilient valve stop as hereinafter explained.

Check valve body 42 has an externally threaded shank portion 57 adapted for connection to a paint supply line 12 of the type shown in FIG. 1. When paint in the supply line is in the static or unpressurized condition, the O-ring 54 is tightly constricted about the annular seat to close the radial passages 52 best shown in FIG. 5. Accordingly, no flow of paint from the supply line 12 through the bore 50 of check valve body 42 and into the interior chamber of color change mechanism body 36 is possible. However, when paint in the supply line 12 is pressurized, the O-ring 54 is expanded radially off of the seat to permit paint to flow around the ring 54 and into the interior chamber of the body 36. Since all other check valves are closed, the paint cannot back up into any of the other supply lines or into the solvent line 18 since the solvent line is provided with an identical check valve body 42a as shown in FIG. 4. The solvent line check valve 42a is disposed in the aperture of one of the major plane faces of hexagonal body 36 strictly for purposes of identification while the other six paint lines are connected to the check valve bodies around the peripheral faces. An outlet fitting 58 is threaded into the remaining eighth aperture of body 36 and is adapted for connection to the line 20 which runs to the paint dispenser gun 10 as previously described.

As soon as pressure is removed from the paint in the supply line 12, the O-ring 54 of the previously selected check valve immediately constricts to close passage 52 and cut-off further flow as can be readily seen in FIG. 5.

Although the O-ring pressure responsive check valves are believed to be suitable and practicable for use in the implementation of the invention, it is to be understood that other types of pressure responsive, normally closed biased check valves may also be employed. It is preferable, however, that the valve selected be of the type which requires no trigger signal or control line running to the valve mechanism 16.

FIG. 6 illustrates a possible configuration wherein a plurality of color changing valve mechanisms 16a, 16b and 16c are connected in series to a single paint dispensing gun 10a through a single pressure regulating valve 22a. In addition, FIG. 6 illustrates the direct mounting of the color changing valve mechanisms 16a, 16b and 16c on the gun 10a. Obviously 1, 2, 3 or more color changing valve mechanisms may be put into the series arrangement and directly mounted on the gun 10a, the illustration of FIG. 6 being for purposes of example only.

FIG. 7 illustrates a system wherein paint recirculation is provided over substantially the entire length of the paint supply lines. In this system a pair of paint dispensing guns 10b and 10c are connected in parallel to receive paints of different colors by way of individual supply lines 60a, 60b, 60c, 60d, 60e and 60f, each of which includes a manually or remotely controlled flow valve 62a through 62f, respectively. The supply lines 60a through 60f are presumed to be connected through the valves to pressurized paint supply sources such that when the valves 62 are opened, paint flows under pressure toward the paint dispensing guns 10.

Lines 60a through 60f are connected through T-connectors represented in FIG. 7 by the reference numeral 68, having short outlet or branch lines 70 extending to individually valved inlet ports of color changing mechanisms 16d and 16e, respectively. The outlets of the color changing valve mechanisms 16d and 16e are connected to the paint guns 10b and 10c through pressure regulating valves 22b, 22c, respectively. It will be understood that the color changing valve mechanisms 16d and 16e are constructed in accordance with the disclosures of FIGS. 3, 4 and 5 previously described.

In addition, the paint supply lines are connected to normally open solenoid controlled valves 64a through 64f, the outlets of which are connected to return lines 66a through 66f such that under normal conditions non-selected paint lines produce a continuous recirculating flow of paint from the supply, through lines 60 and valves 64 and back to the supply. However, when a specific color is selected, the valve 64 corresponding to that color is closed. This creates a pressure rise in the supply line 60 representing the color to be sprayed, such pressure rise operating to unseat the pressure-responsive valves associated therewith in the color changing valve mechanisms 16d and 16e permitting paint to flow to and through the dispensing guns 10b and 10c. The valves 64 associated with non-selected lines remain open such that little or no back pressure is created and the pressure responsive valves in the color changing mechanisms associated with those colors remain seated; i.e., closed. Since the outlet branches of the T's 68 are kept very short, the non-circulating paint quantity is very small.

It is to be understood that various modifications and additions to the system disclosed herein for illustrative purposes are possible and accordingly the foregoing description is not to be construed in a limiting sense.

The embodiments of the invention in which an exclusive property or privilege is claimed are defined as follows:

1. A multi-color paint dispensing system wherein the color changing valve mechanism is proximate the dispensing paint comprising:
    a paint atomizing gun;
    a plurality of paint supply lines;
    means remote from said atomizing gun for selectively pressurizing each of said paint supply lines;
    and a color changing valve mechanism proximate the atomizing gun and having a plurality of inlets, each inlet connected to a respective supply line and an outlet operatively connected to said atomizing gun;
    said color changing valve mechanism including a plurality of paint pressure responsive valve means, each of said paint pressure responsive valve means individually connecting a respective inlet to said outlet;
    said paint pressure responsive valve means including means creating communication between said respective inlet and outlet upon pressurization of the respective connected supply line but preventing flow out of said color changing valve mechanism through said paint pressure responsive check valve means, whereby a pressure of predetermined value in an individual paint supply line created by pressurization of said line causes paint to be dispensed from that paint supply line only.

2. Apparatus as defined in claim 1 wherein said pressure responsive valve means each comprises a valve seat mediate an inlet and said outlet, and stop means resiliently urged against said seat to close the valve but responsive to pressure of at least said predetermined value applied thereto from said inlet to open and permit the flow of paint to said outlet.

3. Apparatus as defined in claim 2 wherein said seat is annular in configuration and said stop means includes a ring of resilient sealing material responsive to point pressure to expand radially outwardly from said seat.

4. Apparatus as defined in claim 1 wherein said color changing valve mechanism comprises a body having a plurality of commonly connected apertures formed therein and defining said inlets and outlet, said pressure responsive valve means being disposed in said apertures.

5. Apparatus as defined in claim 1 wherein said means for selectively pressurizing each of said paint supply lines comprises a plurality of trigger signal-responsive valves having a first condition wherein paint circulates therethrough under pressure, and a second condition wherein paint is directed out through a supply line, said first and second conditions being selected by the presence and absence of a trigger signal applied thereto.

6. Apparatus as defined in claim 5 wherein said means for selectively pressurizing each of said paint supply lines is relatively remote from said dispenser.

7. A multi-color paint dispensing system for recirculating paint supply lines comprising:
    a paint atomizing gun;
    a plurality of paint supply lines individually connectable to sources of paint under pressure;
    a plurality of valves individually connected in said paint supply lines for controlling the flow of paint in said supply lines back to the individual sources for purposes of recirculation;
    each of said valves being normally opened during system operation to permit said recirculation but being individually closable to create a pressure rise in a given supply line;
    a color changing valve mechanism proximate the atomizing gun and having plural inlets each connected to a respective supply line and an outlet connected to said gun, said color changing valve mechanism including pressure responsive valves means individually connecting each of the inlets to said outlet upon pressurization of the respective supply line and preventing flow out from said color changing valve mechanism into any of said supply lines, whereby a pressure rise in an individual line causes paint to be dispensed from that line only.

* * * * *